(12) United States Patent
Morita

(10) Patent No.: US 11,199,131 B2
(45) Date of Patent: Dec. 14, 2021

(54) MULTISTAGE AXIAL COMPRESSOR AND GAS TURBINE

(71) Applicant: MITSUBISHI HEAVY INDUSTRIES, LTD., Tokyo (JP)

(72) Inventor: Daisuke Morita, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 76 days.

(21) Appl. No.: 16/083,720

(22) PCT Filed: Mar. 3, 2017

(86) PCT No.: PCT/JP2017/008438
§ 371 (c)(1),
(2) Date: Sep. 10, 2018

(87) PCT Pub. No.: WO2017/159397
PCT Pub. Date: Sep. 21, 2017

(65) Prior Publication Data
US 2019/0093554 A1   Mar. 28, 2019

(30) Foreign Application Priority Data

Mar. 14, 2016   (JP) .............................. JP2016-050170

(51) Int. Cl.
*F02C 6/08*   (2006.01)
*F02C 9/18*   (2006.01)
(Continued)

(52) U.S. Cl.
CPC .................. *F02C 6/08* (2013.01); *F02C 3/06* (2013.01); *F02C 7/143* (2013.01); *F02C 9/18* (2013.01); *F04D 19/02* (2013.01); *F04D 29/54* (2013.01)

(58) Field of Classification Search
CPC ............... F04D 27/0207; F04D 27/023; F04D 2260/606; F04D 29/54; F04D 29/541; F02C 9/18; F02C 6/08
See application file for complete search history.

(56) References Cited

U.S. PATENT DOCUMENTS 3,848,636 A * 11/1974 McCombs ............ F04D 27/023
137/624.27
4,463,552 A * 8/1984 Monhardt ............... F01D 25/32
60/226.1
(Continued)

FOREIGN PATENT DOCUMENTS

CN   102042089   5/2011
CN   104154042   11/2014
(Continued)

OTHER PUBLICATIONS

Notification of Reason for Refusal dated Sep. 16, 2019 in corresponding Korean Patent Application No. 10-2018-7026010, with Machine Translation.
(Continued)

*Primary Examiner* — David E Sosnowski
*Assistant Examiner* — Andrew J Marien
(74) *Attorney, Agent, or Firm* — Wenderoth, Lind & Ponack, L.L.P.

(57) ABSTRACT

A multistage axial compressor includes: a rotational shaft to which a plurality of rotor blades are mounted; a casing surrounding the rotational shaft, the casing forming a flow passage of a working fluid between the rotational shaft and the casing; a wall portion having an annular shape and extending in a circumferential direction of the rotational shaft so as to surround the casing, the wall portion forming an bleed chamber having an annular shape and being in communication with the flow passage; a plurality of port portions connected to an outer peripheral surface of the wall
(Continued)

portion, the port portions forming respective outlet flow passages which are in communication with the bleed chamber; and a plurality of bleed pipes connected to the respective port portions.

9 Claims, 3 Drawing Sheets

(51) Int. Cl.
F04D 19/02 (2006.01)
F04D 29/54 (2006.01)
F02C 3/06 (2006.01)
F02C 7/143 (2006.01)

(56) References Cited

U.S. PATENT DOCUMENTS

| | | | |
|---|---|---|---|
| 5,531,565 A | 7/1996 | Meindl et al. | |
| 8,973,372 B2 | 3/2015 | Lee et al. | |
| 9,695,701 B2 | 7/2017 | Depaepe | |
| 10,100,844 B2 | 10/2018 | Walker | |
| 2009/0297335 A1* | 12/2009 | Karafillis | F01D 17/105 |
| | | | 415/115 |
| 2011/0083444 A1 | 4/2011 | Bathina et al. | |
| 2014/0286746 A1 | 9/2014 | Nichols et al. | |
| 2016/0131158 A1* | 5/2016 | Walker | F02C 6/08 |
| | | | 60/726 |
| 2016/0326957 A1* | 11/2016 | Feulner | F04D 29/701 |

FOREIGN PATENT DOCUMENTS

| | | |
|---|---|---|
| CN | 104619957 | 5/2015 |
| CN | 105378294 | 3/2016 |
| JP | 58-108158 | 7/1983 |
| JP | 7-63199 | 3/1995 |
| JP | 2014-145265 | 8/2014 |

OTHER PUBLICATIONS

Chinese Office Action dated Sep. 30, 2019 in corresponding Chinese Patent Application No. 201780016280.7 with Machine translation.
International Search Report dated May 9, 2017 in International (PCT) Application No. PCT/JP2017/008438, with English translation.
International Preliminary Report on Patentability dated Sep. 18, 2018 in International (PCT) Application No. PCT/JP2017/008438, with English Translation.

* cited by examiner

MULTISTAGE AXIAL COMPRESSOR AND GAS TURBINE

TECHNICAL FIELD

The present disclosure relates to a multistage axial compressor and a gas turbine.

BACKGROUND ART

In a multistage axial compressor, at the time of low-speed rotation, such as startup operation and speed-decreasing operation for stopping the machine, the flow of a working fluid, such as air, becomes unstable. To avoid such an event, some multistage axial compressors include an bleed structure.

For instance, in the rotary machine disclosed in Patent Document 1, a compressor casing includes an bleed chamber, a main flow passage, a communication passage and an bleed nozzle formed therein, and an bleed pipe is connected to the bleed nozzle. A flow-rate adjustment valve is disposed in the bleed pipe. By adjusting the opening degree of the flow-rate adjustment valve, the air flowing through the main flow passage under compression is extracted to the outside of the compressor casing through the communication passage, the bleed chamber, the bleed nozzle and the bleed pipe.

Further, in the rotary machine disclosed in Patent Document 1, of the first and second inner peripheral surfaces of the bleed nozzle disposed on the first side and the second side in the circumferential direction centered at the rotational axis, at least the first surface includes a direction conversion suppressing part which extends in a direction toward the second side gradually in the circumferential direction, radially outward from the radially outer side surface of the bleed chamber.

Herein, inside the annular-shaped communication passage and the bleed chamber, air swirls toward the second side in the circumferential direction about the rotational axis, that is, in a direction of rotation of the compressor rotor.

Even though the air swirls as described above, compressed air flowing through the bleed chamber toward the second side in the circumferential direction along the radially outer side surface of the bleed chamber flows along the direction conversion suppressing part of the first surface, even when reaching the bleed chamber side of the bleed nozzle, and can flow into the bleed nozzle almost without separating from the radially outer side surface of the bleed chamber and the first surface of the bleed nozzle.

CITATION LIST

Patent Literature

Patent Document 1: JP2014-145265A

SUMMARY

Problems to be Solved

When separation occurs in the flow of air that flows into the bleed nozzle from the bleed chamber, the pressure loss increases in the bleed system that extends from the communication passage to the bleed pipe, which leads to reduction of the bleed flow rate. Thus, to reduce pressure loss in the bleed system and increase the bleed flow rate, it is desirable to minimize separation of the flow of air that flows from the bleed chamber into the bleed nozzle. For this, the connection angle of the bleed nozzle with respect to the bleed chamber is important. However, Patent Document 1 has no specific disclosure in relation to the connection angle.

In view of the above, an object of at least one embodiment of the present invention is to provide a multistage axial compressor and a gas turbine with an increased exhaust flow rate, which can operate stably during low-speed rotation.

Solution to the Problems (1) According to at least one embodiment, a multistage axial compressor includes: a rotational shaft to which a plurality of rotor blades are mounted; a casing surrounding the rotational shaft, the casing forming a flow passage of a working fluid between the rotational shaft and the casing; a wall portion having an annular shape and extending in a circumferential direction of the rotational shaft so as to surround the casing, the wall portion forming an bleed chamber having an annular shape and being in communication with the flow passage; a plurality of port portions connected to an outer peripheral surface of the wall portion, the port portions forming respective outlet flow passages which are in communication with the bleed chamber; and a plurality of bleed pipes connected to the respective port portions. In a cross-sectional view orthogonal to the rotational shaft, of two corner regions where an inner surface of each of the port portions and an inner surface of the wall portion intersect with each other, at the corner region positioned on a back side in a rotational direction of the working fluid in the bleed chamber, when $\theta 1$ is defined as an angle formed between the inner surface of the port portion and the inner surface of the wall portion, the angle $\theta 1$ is not greater than 225°.

With the above configuration (1), the angle $\theta 1$ is not greater than 225°, and thus separation of the flow of the working fluid at the corner region on the back side in the rotational direction of the working fluid is prevented, when the working fluid flows into the port portion from the bleed chamber. Thus, the pressure loss of working fluid flowing into the port portion from the bleed chamber is reduced, and the working fluid flows smoothly into the port portion from the bleed chamber, increasing the bleed flow rate. As a result, the multistage axial compressor having the above configuration (1) can operate stably even during low-speed rotation.

(2) In some embodiments, in the above configuration (1), in the cross-sectional view orthogonal to the rotational shaft, of the two corner regions where the inner surface of each of the port portions and the inner surface of the wall portion intersect with each other, at the corner region positioned on a front side in the rotational direction of the working fluid in the bleed chamber, when $\theta 2$ is defined as an angle formed between the inner surface of the port portion and the inner surface of the wall portion, the angle $\theta 2$ is not smaller than 315°.

With the above configuration (2), since the angle $\theta 2$ is not smaller than 315°, the working fluid can flow smoothly from the bleed chamber into the port portion. Thus, the pressure loss of fluid flowing into the port portion from the bleed chamber is reduced, and the working fluid flows smoothly into the port portion from the bleed chamber, increasing the bleed flow rate. As a result, the multistage axial compressor having the above configuration (2) can operate stably even during low-speed rotation.

(3) In some embodiments, in the above configuration (2), when d is an inner diameter of each of the port portions and D is an outer diameter of the bleed chamber, in the cross-sectional view orthogonal to the rotational shaft, the angle θ1 satisfies a relationship expressed by the following expression: $270°-\sin^{-1}((1-d/D)^{0.5})\cdot 180°/\pi \leq \theta 1$, and the angle θ2 satisfies a relationship expressed by the following expression: $\theta 2 \leq 270°+\sin^{-1}((1-d/D)^{0.5})\cdot 180°/\pi$.

The smaller the angle θ1 is, the better for preventing separation of the flow of the working fluid. However, the angle θ1 cannot be smaller than the angle at the time when the port portion is connected to the bleed chamber in the tangent direction (tangent direction angle). When θt1 is the tangent direction angle at the corner region on the back side in the rotational direction of the working fluid, represented according to the above definition of the angle θ1, the following expression is satisfied: $\theta t1=270°-\sin^{-1}((1-d/D)^{0.5})\cdot 180°/\pi$. Accordingly, the tangent direction angle θt1 can be determined on the basis of the outer diameter of the bleed chamber and the inner diameter of the port portion. Thus, with the above configuration (3), on the basis of the outer diameter of the bleed chamber and the inner diameter of the port portion, the minimum value of the angle θ1 is set to be the tangent direction angle θt1.

Similarly, the greater the angle θ2 is, the better for achieving a smooth flow of working fluid from the bleed chamber to the port portion, but the angle θ2 cannot be greater than the angle at the time when the port portion is connected to the bleed chamber in the tangent direction (tangent direction angle). When θt2 is the tangent direction angle at the corner region on the front side in the rotational direction of the working fluid, represented according to the above definition of the angle θ2, the following expression is satisfied: $\theta t2=270°+\sin^{-1}((1-d/D)^{0.5})\cdot 180°/\pi$. Accordingly, the tangent direction angle θt2 can be determined on the basis of the outer diameter of the bleed chamber and the inner diameter of the port portion. Thus, with the above configuration (3), on the basis of the outer diameter of the bleed chamber and the inner diameter of the port portion, the maximum value of the angle θ2 is set to be the tangent direction angle θt2.

(4) In some embodiments, in any one of the above configurations (1) to (3), at least one of the plurality of bleed pipes includes at least one curved portion, and, when d is an inner diameter of each of the port portions in the cross-sectional view orthogonal to the rotational shaft and R is a curvature radius of the at least one curved portion, a ratio R/d of the curvature radius R of the at least one curved portion to the inner diameter d of the port portion satisfies a relationship expressed by the following expression: $2 \leq R/d$.

With the above configuration (4), the ratio R/d of the curvature radius R of the curved portion to the inner diameter d of the port portion is not smaller than two, and thus the pressure loss of the working fluid in the bleed pipe is reduced, and the working fluid can flow through the bleed pipe smoothly. As a result, it is possible to increase the flow rate of the working fluid that flows through the bleed pipe, that is, the bleed flow rate, and thus the multistage axial compressor having the above configuration (4) can operate stably even during low-speed rotation with a simple configuration.

(5) In some embodiments, in the above configuration (4), the rotational shaft extends in a horizontal direction. The plurality of port portions include a first port portion, a second port portion, a third port portion, and a fourth port portion, which are arranged in this order in the circumferential direction of the rotational shaft. The first port portion and the second port portion are positioned on a first side of a center of the rotational shaft in a horizontal direction orthogonal to the rotational shaft, in the cross-sectional view orthogonal to the rotational shaft. The third port portion and the fourth port portion are positioned on a second side opposite to the first side of the center of the rotational shaft in the horizontal direction orthogonal to the rotational shaft, in the cross-sectional view orthogonal to the rotational shaft. The plurality of bleed pipes include a first bleed pipe, a second bleed pipe, a third bleed pipe, and a fourth bleed pipe connected to the first port portion, the second port portion, the third port portion, and the fourth port portions, respectively. The first bleed pipe and the second bleed pipe extend to the second side of the center of the rotational shaft in the horizontal direction orthogonal to the rotational shaft, in the cross-sectional view orthogonal to the rotational shaft. The at least one curved portion includes a first curved portion forming a part of the first bleed pipe and a second curved portion forming a part of the second bleed pipe. The first curved portion and the second curved portion are curved so that a rotational direction of the working fluid flowing through the first curved portion and the second curved portion is the same as a rotational direction of the working fluid in the bleed chamber in the cross-sectional view orthogonal to the rotational shaft.

With the above configuration (5), the first curved portion and the second curved portion are curved so that the rotational direction of the working fluid flowing through the first and second curved portions is the same direction as the rotational direction of the rotational shaft, in a cross-sectional view orthogonal to the rotational shaft, and thus the working fluid can flow through the first curved portions and the second curved portion smoothly. As a result, it is possible to increase the flow rate of the working fluid that flows through the first bleed pipe and the second bleed pipe, that is, the bleed flow rate, and thus the multistage axial compressor having the above configuration (5) can operate stably even during low-speed rotation with a simple configuration.

(6) In some embodiments, in the above configuration (5), the at least one curved portions includes a third curved portion forming a part of the third bleed pipe and a fourth curved portion forming a part of the fourth bleed pipe, and the third curved portion and the fourth curved portion are curved so that a rotational direction of the working fluid flowing through the third curved portion and the fourth curved portion is opposite to the rotational direction of the working fluid in the bleed chamber.

With the above configuration (6), the third curved portion and the fourth curved portion are curved so that the rotational direction of the working fluid flowing through the third and fourth curved portions is opposite to the rotational direction of the rotational shaft, in a cross-sectional view orthogonal to the rotational shaft, but the ratio R/d is not smaller than two, so the pressure loss at the third curved portion and the fourth curved portion is reduced. As a result, it is possible to increase the flow rate of the working fluid that flows through the third bleed pipe and the fourth bleed pipe, that is, the bleed flow rate, and thus the multistage axial compressor having the above configuration (6) can operate stably even during low-speed rotation with a simple configuration.

(7) In some embodiments, in any one of the above configurations (4) to (6), the rotational shaft extends in a horizontal direction. The plurality of port portions include a first port portion, a second port portion, a third port portion, and a fourth port portion, which are arranged in this order in the circumferential direction of the rotational shaft. The first portion and the second port portion are positioned on a first side of a center of the rotational shaft in a horizontal direction orthogonal to the rotational shaft, in the cross-sectional view orthogonal to the rotational shaft. The third port portion and the fourth port portion are positioned on a second side opposite to the first side of the center of the rotational shaft in the horizontal direction orthogonal to the rotational shaft, in the cross-sectional view orthogonal to the rotational shaft. The first port portion and the third port portion extend along the horizontal direction orthogonal to the rotational shaft, and the second port portion and the fourth port portion extend along a vertical direction.

With the above configuration (7), the first port portion and the third port portion extend in the horizontal direction and the second port portion and the fourth port portion extend in the vertical direction, which makes it possible to prevent separation of the flow of working fluid flowing into the first port portion, the second port portion, the third port portion, and the fourth port portion with a simple configuration. As a result, the multistage axial compressor having the above configuration (7) can ensure a sufficient bleed flow rate and operate stably even during low-speed rotation, with a simple configuration.

(8) In some embodiments, in any one of the above configurations (4) to (7), the rotational shaft extends in a horizontal direction. The plurality of port portions include a first port portion, a second port portion, a third port portion, and a fourth port portion. When a circumferential position of a top portion of an outer peripheral surface of the wall portion is 0° in the cross-sectional view orthogonal to the rotational shaft, an intersection between the outer peripheral surface of the wall portion and an axis of the first port portion is at a circumferential position of not smaller than 30° and not greater than 60°, an intersection between the outer peripheral surface of the wall portion and an axis of the second port portion is at a circumferential position of not smaller than 120° and not greater than 150°, an intersection between the outer peripheral surface of the wall portion and an axis of the third port portion is at a circumferential position of not smaller than 200° and not greater than 230°, and an intersection between the outer peripheral surface of the wall portion and an axis of the fourth port portion is at a circumferential position of not smaller than 290° and not greater than 320°.

With the above configuration (8), the intersection between the outer peripheral surface of the wall portion and the axis of the first port portion is at the circumferential position between 30° and 60°, the intersection between the outer peripheral surface of the wall portion and the axis of the second port portion is at the circumferential position between 120° and 150°, the intersection between the outer peripheral surface of the wall portion and the axis of the third port portion is between 200° and 230°, and the intersection between the outer peripheral surface of the wall portion and the axis of the fourth port portion is between 290° and 320°. Thus, it is possible to suppress the height of the bleed pipe in the up-down direction. As a result, it is possible to reduce the installation space of the multistage axial compressor having the above configuration (8).

(9) In some embodiments, in any one of the above configurations (4) to (8), the rotational shaft extends in a horizontal direction. The plurality of port portions include a first port portion, a second port portion, a third port portion, and a fourth port portion, which are arranged in this order in the circumferential direction of the rotational shaft. The first port portion and the second port portion are positioned on a first side of a center of the rotational shaft in a horizontal direction orthogonal to the rotational shaft, in the cross-sectional view orthogonal to the rotational shaft. The third port portion and the fourth port portion are positioned on a second side opposite to the first side of the center of the rotational shaft in the horizontal direction orthogonal to the rotational shaft, in the cross-sectional view orthogonal to the rotational shaft. The plurality of bleed pipes include a first bleed pipe, a second bleed pipe, a third bleed pipe, and a fourth bleed pipe connected to the first port portion, the second port portion, the third port portion, and the fourth port portions, respectively. When the cross-sectional view orthogonal to the rotational axis is divided into four quadrants at a vertical axis and a horizontal axis, so as to have an origin at the center of the rotational shaft, farther ends of the first bleed pipe, the second bleed pipe, the third bleed pipe, and the fourth bleed pipe positioned farther from the bleed chamber are positioned in the same quadrant of the four quadrants.

With the above configuration (9), the father ends of the first bleed pipe, the second bleed pipe, the third bleed pipe, and the fourth bleed pipe are positioned in the same quadrant, and thus the farther ends of the first bleed pipe, the second bleed pipe, the third bleed pipe, and the fourth bleed pipe can be coupled to an axial pipe extending in the axial direction of the rotational shaft easily.

(10) In some embodiments, in the above configuration (9), the farther ends of the first bleed pipe, the second bleed pipe, the third bleed pipe, and the fourth bleed pipe are positioned on an outer side of the casing, in the horizontal direction orthogonal to the rotational shaft.

In some cases, a concrete mount or the like for supporting the casing is disposed below the casing. Thus, it is difficult to locate the axial pipe extending in the axial direction of the rotational shaft below the casing.

In this regard, with the above configuration (10), the farther ends of the first bleed pipe, the second bleed pipe, the third bleed pipe, and the fourth bleed pipe are positioned in the same quadrant and on the outer side of the casing in the horizontal direction, and thus the farther ends of the first bleed pipe, the second bleed pipe, the third bleed pipe, and the fourth bleed pipe can be coupled to the axial pipe extending in the axial direction of the rotational shaft easily.

(11) According to at least one embodiment of the present invention, a gas turbine includes: a multistage axial compressor; a combustor capable of producing combustion gas by combusting fuel by utilizing air compressed by the multistage axial compressor; and a turbine capable of outputting power by utilizing combustion gas produced in the combustor. The multistage axial compressor includes: a rotational shaft to which a plurality of rotor blades are mounted; a casing surrounding the rotational shaft, the casing forming a flow passage of the air serving as a working fluid between the rotational shaft and the casing; a wall portion having an annular shape and extending in a circumferential direction of the rotational shaft so as to surround the casing, the wall portion forming an bleed chamber having an annular shape and being in communication with the flow passage; a plurality of port portions connected to an outer peripheral surface of the wall portion, the port portions forming respective outlet flow passages which are in communication with the bleed chamber; and a plurality of bleed pipes connected to the respective port portions. In a cross-sectional view orthogonal to the rotational shaft, of two corner regions where an inner surface of each of the port portions and an inner surface of the wall portion intersect with each other, at the corner region positioned on a back side in a rotational direction of the working fluid in the bleed chamber, when θ1 is defined as an angle formed between the inner surface of the port portion and the inner surface of the wall portion, the angle θ1 is not greater than 225°.

With the above configuration (11), the angle θ1 is not greater than 225°, and thus separation of the flow of the working fluid at the corner region on the back side in the rotational direction is prevented, when the working fluid flows into the port portion from the bleed chamber. Thus, the pressure loss of fluid flowing into the port portion from the bleed chamber is reduced, and the working fluid flows smoothly into the port portion from the bleed chamber, increasing the bleed flow rate. As a result, the multistage axial compressor can operate stably even during low-speed rotation, and thus the gas turbine having the above configuration (1) can operate stably during low-speed rotation, such as during start up and speed reduction for stopping the machine.

With the above configurations (4) to (10), the bleed amount can be increased by suppressing the pressure loss in the bleed pipe, even if the above configurations (1) to (3) are not provided. Thus, when an object is to provide a multistage axial compressor and a gas turbine with an increased exhaust flow rate, which can operate stably during low-speed rotation, this object can be achieved by the above compressions (4) to (10), even if the above configurations (1) to (3) are not provided.

Advantageous Effects

According to at least one embodiment of the present invention, it is possible to provide a multistage axial compressor and a gas turbine with an increased exhaust flow rate, which can operate stably during low-speed rotation.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
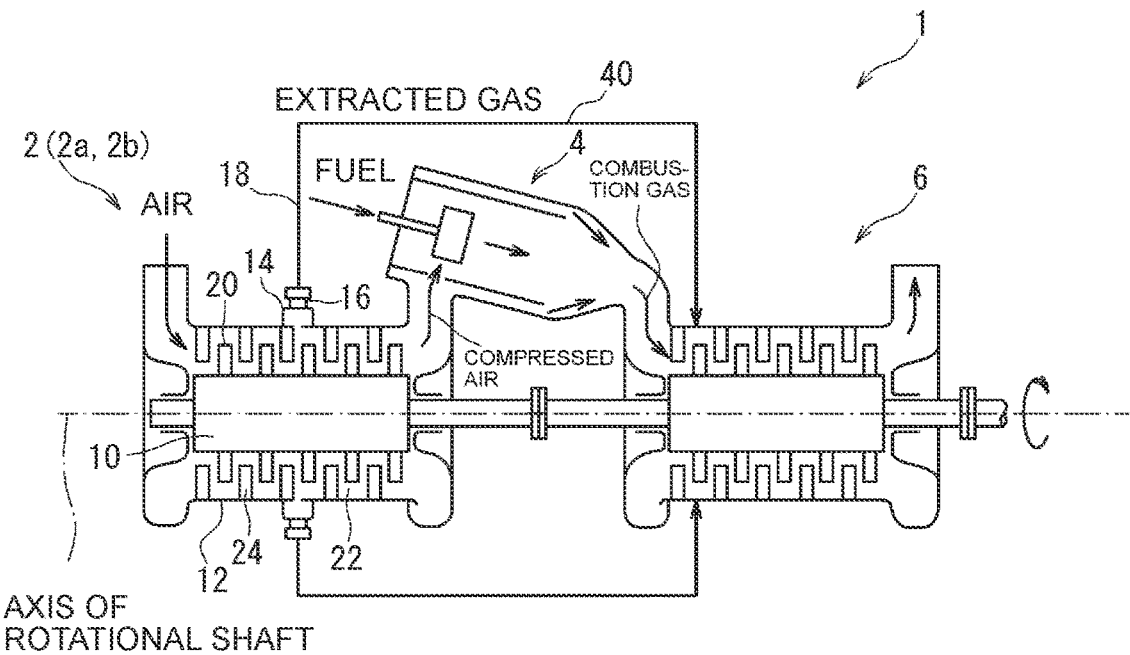
FIG. 1 is a schematic configuration diagram of a gas turbine according to an embodiment of the present invention.
Figure 2:
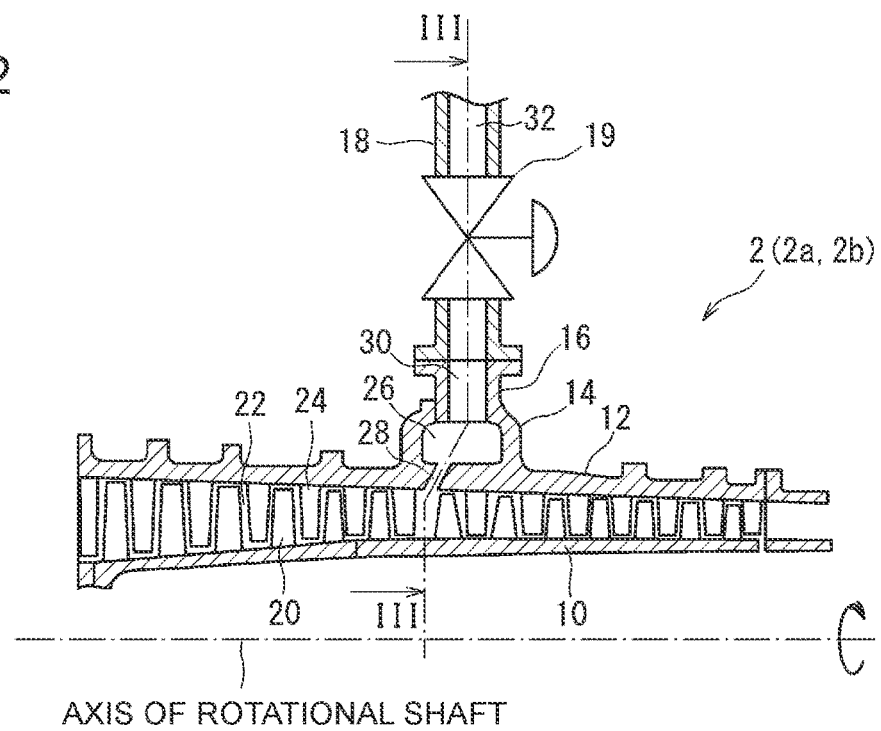
FIG. 2 is a schematic configuration diagram of a part of a multistage axial compressor applied to the gas turbine of FIG. 1.
Figure 3:
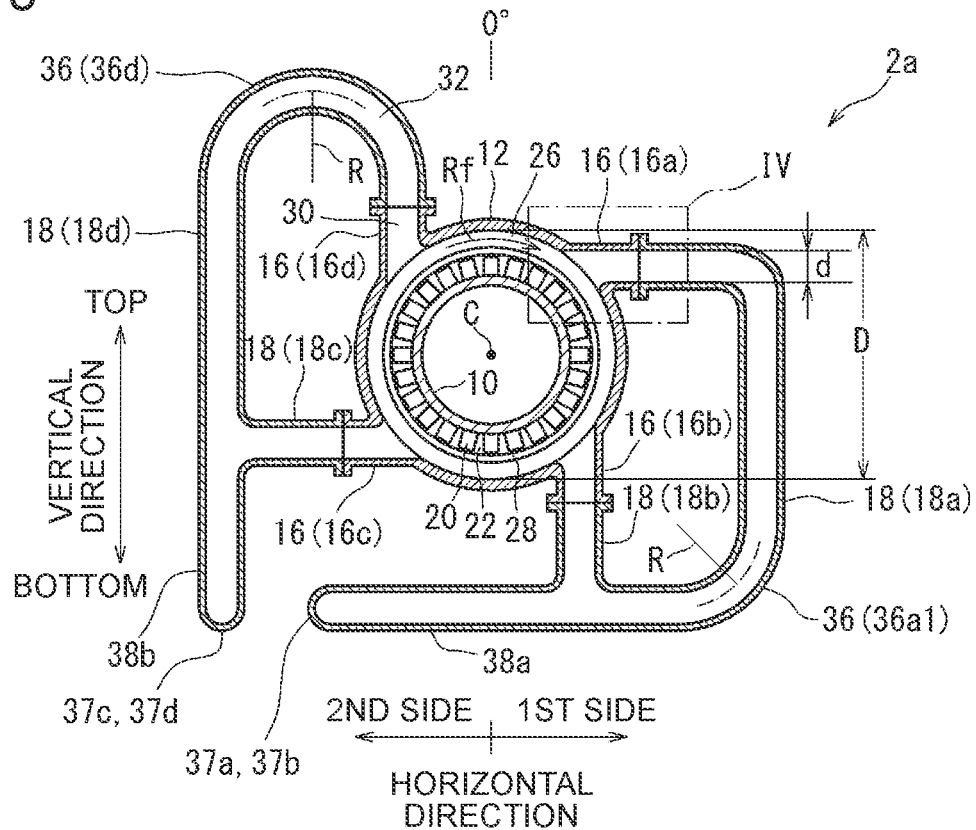
FIG. 3 is a schematic cross-sectional view taken along line in FIG. 2.
Figure 4:
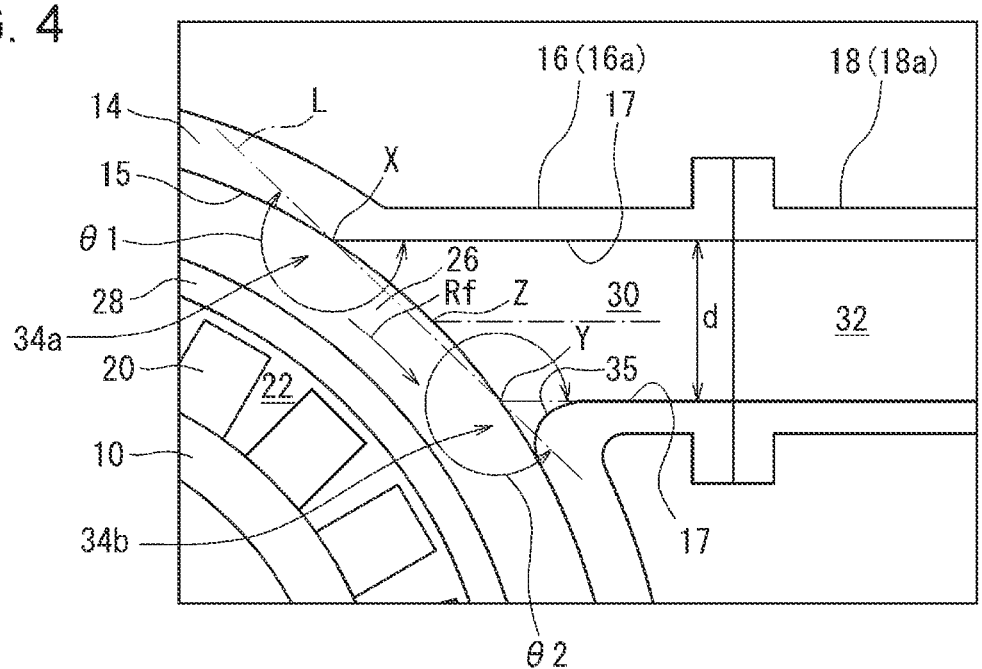
FIG. 4 is an enlarged view of region IV in FIG. 3.
Figure 5:
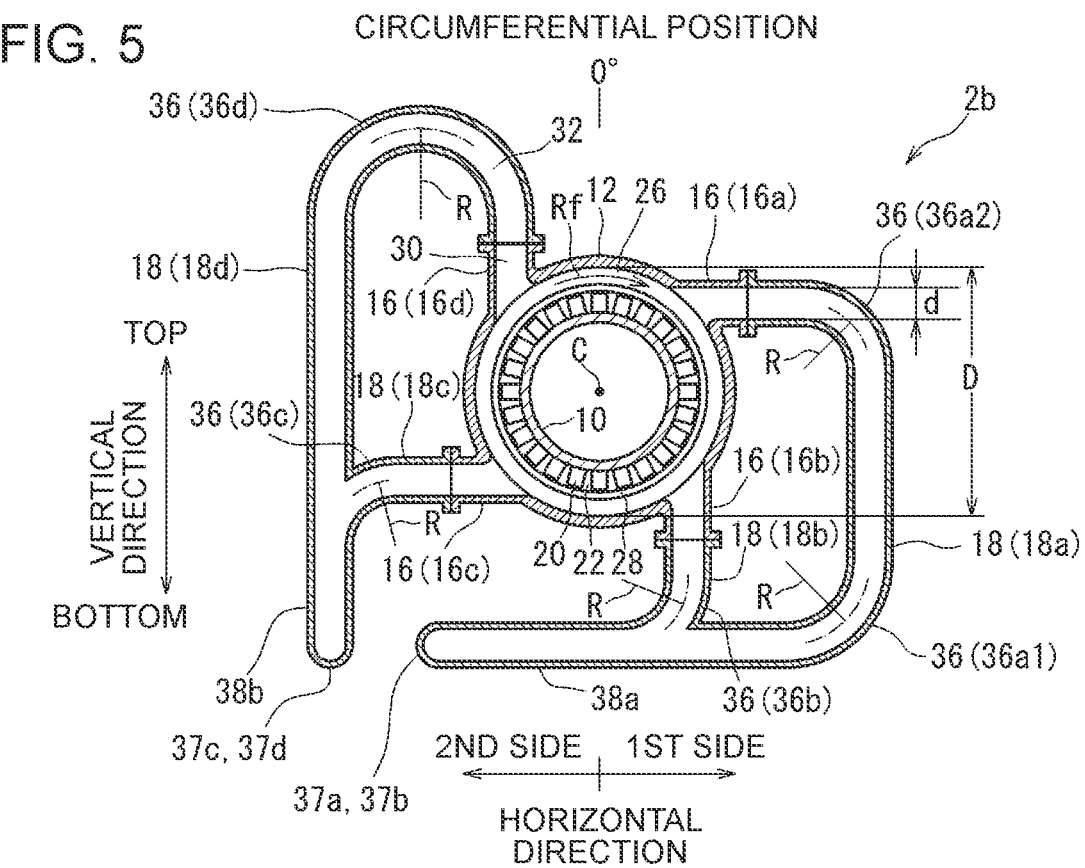
FIG. 5 is a schematic cross-sectional view of a multistage axial compressor according to another embodiment, corresponding to FIG. 3.

FIG. 1 is a schematic configuration diagram of a gas turbine 1 according to an embodiment of the present invention. FIG. 2 is a schematic configuration diagram of a part of a multistage axial compressor 2a, 2b applied to the gas turbine 1 of FIG. 1. FIG. 3 is a schematic cross-sectional view taken along line in FIG. 2. FIG. 4 is an enlarged view of region IV in FIG. 3. FIG. 5 is a schematic cross-sectional view of a multistage axial compressor 2b according to another embodiment, corresponding to FIG. 3.

In the following description, multistage axial compressors 2a, 2b are also collectively referred to as a multistage axial compressor 2.

As shown in FIG. 1, the gas turbine 1 according to an embodiment of the present invention includes a multistage axial compressor 2, a combustor 4, and a turbine 6.

The combustor 4 is capable of producing high-temperature combustion gas by combusting fuel by utilizing air compressed by the multistage axial compressor 2.

The turbine 6 is capable of outputting power by utilizing combustion gas produced in the combustor 4. A part of power outputted from the turbine 6 is supplied to the multistage axial compressor 2, and the remainder is supplied to a generator (not shown) to be utilized in power generation.

As shown in FIGS. 1 to 5, the multistage axial compressor 2 includes a rotational shaft 10, a casing 12, a wall portion 14, a plurality of port portions 16, and a plurality of bleed pipes 18.

A plurality of rotor blade rows are mounted to the rotational shaft 10. The plurality of rotary blade rows are disposed at a distance from one another along the axial direction of the rotational shaft 10. Each rotary blade row includes a plurality of rotor blades 20 each mounted to the rotational shaft 10, and in each rotary blade row, the plurality of rotor blades 20 are arranged in the circumferential direction of the rotational shaft 10.

The casing 12 surrounds the rotational shaft 10, and a flow passage 22 for a working fluid is formed between the casing 12 and the rotational shaft 10. In the case of the multistage axial compressor 2 applied to the gas turbine 1, the working fluid is air.

Further, a plurality of stator vane rows are mounted to the casing 12. The plurality of stator vane rows are disposed at a distance from one another along the axial direction of the rotational shaft 10. The rotor blade rows and the stator vane rows are arranged alternately in the axial direction of the rotational shaft 10. Each stator vane row includes a plurality of stator vanes 24 each mounted to the casing 12, and in each stator vane row, the plurality of stator vanes 24 are arranged in the circumferential direction of the rotational shaft 10.

The wall portion 14 extends in the circumferential direction of the rotational shaft 10 so as to surround the casing 12, and forms an annular space (bleed chamber) 26 in communication with the flow passage 22, around the flow passage 22. For instance, the bleed chamber 26 is in communication with the flow passage 22 via a slit (communication passage)

28 formed in the casing 12. Furthermore, the bleed chamber 26 is in communication with a middle section of the flow passage 22 in the axial direction of the rotational shaft 10, so as to be capable of extracting the working fluid under compression. The middle section refers not to the center, but to the section excluding the opposite ends.

The plurality of port portions (bleed nozzles) 16 are connected to the outer peripheral surface of the wall portion 14. Each port portion 16 has a hollow cylindrical shape, and forms an outlet flow passage 30 which is in communication with the bleed chamber 26.

A plurality of bleed pipes 18 are connected to the respective port portions 16. Each bleed pipe 18 forms a pipe passage 32 connecting to the outlet flow passage 30. Further, the port portion 16 may be formed integrally with the wall portion 14, or integrally with the bleed pipe 18. In the latter case, an end portion of the bleed pipe 18 may be directly connected to the wall portion 14, to form the outlet flow passage.

A plurality of flow-rate adjustment valves 19 are disposed in the respective bleed pipes 18, and the flow rate of the working fluid flowing through the bleed pipes 18 can be adjusted by adjusting the opening degrees of the flow-rate adjustment valves 19. The working fluid extracted through the bleed pipes 18 can be used to cool the turbine 6, for instance. In FIGS. 3 and 5, the flow-rate adjustment valves 19 are not depicted.

Herein, as shown in FIG. 4, in a cross-sectional view orthogonal to the rotational shaft 10, of the two corner regions 34a, 34b at which the inner surface 17 of the port portion 16 and the inner surface 15 of the wall portion 14 (outer peripheral surface of the bleed chamber 26) intersect with each other, θ1 is defined as the angle formed between the inner surface 17 of the port portion 16 and the inner surface 15 of the wall portion 14, at the corner region 34a disposed on the back side in the rotational direction Rf of the working fluid in the bleed chamber 26.

Further, more accurately, for defining the angle θ1 in the present specification, in the cross-sectional view orthogonal to the rotational shaft 10, the inner surface 17 of the port portion 16 is defined by the line L passing through two intersections X, Y of the inner surface 15 of the wall portion 14 and the inner surface 17 of the port portion 16. In a case where the corner regions 34a, 34b are processed by R machining, the intersections X, Y may be intersections between extensions of the inner surface 15 of the wall portion 14 and the inner surface 17 of the port portion 16.

Further, in the multistage axial compressor 2 shown in FIGS. 1 to 5, the angle θ1 defined as described above is not greater than 225°.

In the above configuration, the angle θ1 is not greater than 225°, and thus separation of the flow of the working fluid at the corner region 34a on the back side in the rotational direction Rf of the working fluid in the bleed chamber 26 is prevented, when the working fluid flows into the port portion 16 from the bleed chamber 26. Thus, the pressure loss of working fluid flowing into the port portion 16 from the bleed chamber 26 is reduced, and the working fluid flows smoothly into the port portion 16 from the bleed chamber 26, increasing the bleed flow rate. As a result, the multistage axial compressor 2 can operate stably even during low-speed rotation, and thus the gas turbine 1 having the above configuration can operate stably during low-speed rotation, such as during start up and speed reduction for stopping the machine.

In some embodiments, in a cross-sectional view orthogonal to the rotational shaft 10, of the two corner regions 34a, 34b at which the inner surface 17 of the port portion 16 and the inner surface 15 of the wall portion 14 intersect with each other, when defining θ2 as the angle formed between the inner surface 17 of the port portion 16 and the inner surface 15 of the wall portion 14, at the corner region 34b disposed on the front side in the rotational direction Rf of the working fluid in the bleed chamber 26, and the angle θ2 is not smaller than 315°.

Further, more accurately, for defining the angle θ2 in the present specification, in a cross-sectional view orthogonal to the rotational shaft 10, the inner surface 17 of the port portion 16 is defined by the line L connecting two intersections X, Y of the inner surface 15 of the wall portion 14 and the inner surface 17 of the port portion 16. In a case where the corner regions 34a, 34b are processed by R machining, the intersections X, Y may be intersections between extensions of the inner surface 15 of the wall portion 14 and the inner surface 17 of the port portion 16.

With the above configuration, since the angle θ2 is not smaller than 315°, the working fluid can flow smoothly from the bleed chamber 26 into the port portion 16. Thus, the pressure loss of fluid flowing into the port portion 16 from the bleed chamber 26 is reduced, and the working fluid flows smoothly into the port portion 16 from the bleed chamber 26, increasing the bleed flow rate. As a result, the multistage axial compressor 2 having the above configuration can operate stably even during low-speed rotation.

In some embodiments, as shown in FIGS. 3 to 5, when defining d as the inner diameter of the port portion 16 in a cross-sectional view orthogonal to the rotational shaft 10 and D as the outer diameter of the bleed chamber 26 in a cross-sectional view orthogonal to the rotational shaft 10, the angle θ1 satisfies a relationship expressed by the following expression:

$$270°-\sin^{-1}((1-d/D)^{0.5})\cdot 180°/\pi \leq \theta 1,$$

, and the angle θ2 satisfies a relationship expressed by the following expression:

$$\theta 2 \leq 270°+\sin^{-1}((1-d/D)^{0.5})\cdot 180°/\pi.$$

The smaller the angle θ1 is, the better for preventing separation of the flow of the working fluid. However, the angle θ1 cannot be smaller than the angle at the time when the port portion 16 is connected to the bleed chamber 26 in the tangent direction (tangent direction angle). When θt1 is the tangent direction angle at the corner region 34a on the back side in the rotational direction Rf of the working fluid, represented according to the above definition of the angle θ1, the following expression is satisfied: $\theta t1=270°-\sin^{-1}((1-d/D)^{0.5})\cdot 180°/\pi$. Accordingly, the tangent direction angle θt1 can be determined on the basis of the outer diameter D of the bleed chamber 26 and the inner diameter d of the port portion 16. Thus, with the above configuration, on the basis of the outer diameter D of the bleed chamber 26 and the inner diameter d of the port portion 16, the minimum value of the angle θ1 is set to be the tangent direction angle θt1.

Similarly, the greater the angle θ2 is, the better for achieving a smooth flow of working fluid from the bleed chamber 26 to the port portion 16, but the angle θ2 cannot be greater than the angle at the time when the port portion 16 is connected to the bleed chamber 16 in the tangent direction (tangent direction angle). When θt2 is the tangent direction angle at the corner region 34b on the front side in the rotational direction Rf of the working fluid, represented according to the above definition of the angle θ2, the following expression is satisfied: $\theta t2=270°+\sin^{-1}((1-d/D)$ ^0.5)·180°/π. Accordingly, the tangent direction angle θt2 can be determined on the basis of the outer diameter D of the bleed chamber 26 and the inner diameter d of the port portion 16. Thus, with the above configuration, on the basis of the outer diameter D of the bleed chamber 26 and the inner diameter d of the port portion 16, the maximum value of the angle θ2 is set to be the tangent direction angle θt2.

In some embodiments, the port portion 16 has a cylindrical shape having a constant inner diameter d. Furthermore, in a cross-sectional view orthogonal to the rotational shaft 10, the corner region 34b disposed on the front side in the rotational direction Rf of the working fluid may be processed by R machining, and the inner surface 17 of the port portion 16 and the inner surface 15 of the wall portion 14 may be connected via a curved surface 35.

In some embodiments, as shown in FIGS. 3 and 5, at least one of the plurality of bleed pipes 18 has at least one curved portion 36. When R is the curvature radius of the curved portion 36, a ratio R/d of the curvature radius R of the curved portion 36 to the inner diameter d of the port portion 16 (or the inner diameter of the bleed pipe 18) satisfies a relationship expressed by the following expression: 2≤R/d.

With the above configuration, the ratio R/d of the curvature radius R of the curved portion to the inner diameter d of the port portion 16 (or the inner diameter of the bleed pipe 18) is not smaller than two, and thus the pressure loss of the working fluid in the bleed pipe 18 is reduced, and the working fluid can flow through the bleed pipe 18 smoothly. Thus, it is possible to increase the flow rate of the working fluid flowing through the bleed pipe 18, that is, the bleed flow rate. As a result, the multistage axial compressor 2 having the above configuration can operate stably even during low-speed rotation with a simple configuration.

Further, the curvature radius R of the curved portion 36 is the curvature radius at the pipe axis (center axis of the curved portion 36).

In some embodiments, as shown in FIG. 1, the rotational shaft 10 extends in the horizontal direction. Further, as shown in FIGS. 3 and 5, the plurality of port portions 16 include the first port portion 16a, the second port portion 16b, the third port portion 16c, and the fourth port portion 16d.

The first port portion 16a, the second port portion 16b, the third port portion 16c, and the fourth port portion 16d are arranged in this order in the circumferential direction of the rotational shaft 10. The first port portion 16a and the second port portion 16b are positioned on the first side of the center C of the rotational shaft 10 in the horizontal direction orthogonal to the rotational shaft 10, in a cross-sectional view orthogonal to the rotational shaft 10. The third port portion 16c and the fourth port portion 16d are positioned on the second side opposite to the first side, of the center C of the rotational shaft 10 in the horizontal direction orthogonal to the rotational shaft 10, in a cross-sectional view orthogonal to the rotational shaft 10.

The plurality of bleed pipes 18 include the first bleed pipe 18a, the second bleed pipe 18b, the third bleed pipe 18c, and the fourth bleed pipe 18d, connecting to the first port portion 16a, the second port portion 16b, the third port portion 16c, and the fourth port portion 16d, respectively. The first bleed pipe 18a and the second bleed pipe 18b extend to the second side of the center C of the rotational shaft 10 in the horizontal direction orthogonal to the rotational shaft 10, in a cross-sectional view orthogonal to the rotational shaft 10.

Further, as shown in FIG. 5, the at least one curved portion 36 includes the first curved portions 36a1, 36a2 forming a part of the first bleed pipe 18a, and the second curved portion 36b forming a part of the second bleed pipe 18b. The first curved portions 36a1, 36a2 and the second curved portion 36b are curved so that the rotational direction of the working fluid flowing therethrough is the same direction as the rotational direction Rf of the working fluid in the bleed chamber 26, in a cross-sectional view orthogonal to the rotational shaft 10.

With the above configuration, the first curved portions 36a1, 36a2 and the second curved portion 36b are curved so that the rotational direction of the working fluid flowing therethrough is the same direction as the rotational direction Rf of the working fluid in the bleed chamber 26, in a cross-sectional view orthogonal to the rotational shaft 10, and thus the working fluid can flow through the first curved portions 36a1, 36a2 and the second curved portion 36b smoothly. Thus, it is possible to increase the flow rate of the working fluid flowing through the first bleed pipe 18a and the second bleed pipe 18b, that is, the bleed flow rate. As a result, the multistage axial compressor 2b having the above configuration can operate stably even during low-speed rotation with a simple configuration.

In some embodiments, the at least one curved portion 36 includes the third curved portion 36c forming a part of the third bleed pipe 18c, and the fourth curved portion 36d forming a part of the fourth bleed pipe 18d. The third curved portion 36c and the fourth curved portion 36d are curved so that the rotational direction of the working fluid flowing therethrough is opposite to the rotational direction Rf of the working fluid in the bleed chamber 26, in a cross-sectional view orthogonal to the rotational shaft 10.

With the above configuration, the third curved portion 36c and the fourth curved portion 36d are curved so that the rotational direction of the working fluid flowing therethrough is opposite to the rotational direction Rf of the working fluid in the bleed chamber 26, in a cross-sectional view orthogonal to the rotational shaft 10, but the ratio R/d is not smaller than two, so the pressure loss at the third curved portion 36c and the fourth curved portion 36d is reduced. Thus, it is possible to increase the flow rate of the working fluid flowing through the third bleed pipe 18c and the fourth bleed pipe 18d, that is, the bleed flow rate. As a result, the multistage axial compressor 2b having the above configuration can operate stably even during low-speed rotation with a simple configuration.

In some embodiments, as shown in FIG. 1, the rotational shaft 10 extends in the horizontal direction. Further, as shown in FIGS. 3 and 5, the plurality of port portions 16 include the first port portion 16a, the second port portion 16b, the third port portion 16c, and the fourth port portion 16d. The first port portion 16a, the second port portion 16b, the third port portion 16c, and the fourth port portion 16d are arranged in this order in the circumferential direction of the rotational shaft 10.

The first port portion 16a and the second port portion 16b are positioned on the first side of the center C of the rotational shaft 10 in the horizontal direction orthogonal to the rotational shaft 10, in a cross-sectional view orthogonal to the rotational shaft 10. The third port portion 16c and the fourth port portion 16d are positioned on the second side opposite to the first side, of the center C of the rotational shaft 10 in the horizontal direction orthogonal to the rotational shaft 10, in a cross-sectional view orthogonal to the rotational shaft 10.

Further, as shown in FIGS. 3 and 5, the first port portion 16a and the third port portion 16c extend along the horizontal direction orthogonal to the rotational shaft 10, and the second port portion 16b and the fourth port portion 16d extend along the vertical direction.

With the above configuration, the first port portion 16a and the third port portion 16c extend in the horizontal direction and the second port portion 16b and the fourth port portion 16d extend in the vertical direction, which makes it possible to prevent separation of the flow of working fluid flowing into the first port portion 16a, the second port portion 16b, the third port portion 16c, and the fourth port portion 16d with a simple configuration. As a result, the multistage axial compressor 2 having the above configuration can ensure a sufficient bleed flow rate and operate stably even during low-speed rotation, with a simple configuration.

In some embodiments, as shown in FIG. 1, the rotational shaft 10 extends in the horizontal direction. As shown in FIGS. 3 and 5, the plurality of port portions 16 include the first port portion 16a, the second port portion 16b, the third port portion 16c, and the fourth port portion 16d. In a cross-sectional view orthogonal to the rotational shaft 10, the circumferential position of the top (vertex) portion of the outer peripheral surface of the wall portion 14 is defined as 0°. Further, as shown in FIG. 4, in a cross-sectional view orthogonal to the rotational shaft 10, the intersection between the outer peripheral surface of the wall portion 14 and the axis (center line) of the port portion 16 is defined as Z. According to the above definitions, the intersection Z between the outer peripheral surface of the wall portion 14 and the axis of the first port portion 16a is at the circumferential position between 30° and 60°, the intersection Z between the outer peripheral surface of the wall portion 14 and the axis of the second port portion 16b is at the circumferential position between 120° and 150°, the intersection Z between the outer peripheral surface of the wall portion 14 and the axis of the third port portion 16c is between 200° and 230°, and the intersection Z between the outer peripheral surface of the wall portion 14 and the axis of the fourth port portion 16d is between 290° and 320°.

With the above configuration, the intersection Z between the outer peripheral surface of the wall portion 14 and the axis of the first port portion 16a is at the circumferential position between 30° and 60°, the intersection Z between the outer peripheral surface of the wall portion 14 and the axis of the second port portion 16b is at the circumferential position between 120° and 150°, the intersection Z between the outer peripheral surface of the wall portion 14 and the axis of the third port portion 16c is between 200° and 230°, and the intersection Z between the outer peripheral surface of the wall portion 14 and the axis of the fourth port portion 16d is between 290° and 320°. Thus, it is possible to suppress the height of the bleed pipes 18 in the up-down direction. As a result, it is possible to reduce the installation space of the multistage axial compressor 2 having the above configuration.

In some embodiments, when the rotational shaft 10 extends in the horizontal direction and a cross-sectional view orthogonal to the rotational shaft 10 is divided into four quadrants at the vertical axis and the horizontal axis, so as to have its origin at the center C of the rotational shaft 10, as shown in FIGS. 3 and 5, the second ends 37a, 37b, 37c, 37d of the first bleed pipe 18a, the second bleed pipe 18b, the third bleed pipe 18c, and the fourth bleed pipe 18d are positioned in the same quadrant. The second ends 37a, 37b, 37c, 37d of the first bleed pipe 18a, the second bleed pipe 18b, the third bleed pipe 18c, and the fourth bleed pipe 18d are the farther ends from the bleed chamber 26.

Further, as shown in FIGS. 3 and 5, the first bleed pipe 18a and the second bleed pipe 18b may be merged, and the third bleed pipe 18c and the fourth bleed pipe 18d may be merged. In this case, the second end of the first junction pipe 38a formed by merging the first bleed pipe 18a and the second bleed pipe 18b and the second end of the second junction pipe 38b formed by merging the third bleed pipe 18c and the fourth bleed pipe 18d may be positioned in the same quadrant.

With the above configuration, the second ends 37a, 37b, 37c, 37d of the first bleed pipe 18a, the second bleed pipe 18b, the third bleed pipe 18c, and the fourth bleed pipe 18d are positioned in the same quadrant, and thus the second ends 37a, 37b, 37c, 37d of the first bleed pipe 18a, the second bleed pipe 18b, the third bleed pipe 18c, and the fourth bleed pipe 18d can be connected to a pipe (axial pipe) 40 extending in the axial direction of the rotational shaft (see FIG. 1) easily.

In some embodiments, the second ends 37a, 37b, 37c, 37d of the first bleed pipe 18a, the second bleed pipe 18b, the third bleed pipe 18c, and the fourth bleed pipe 18d are positioned in the same quadrant in a cross-sectional view orthogonal to the rotational shaft 10, and on the outer side of the casing 12 in the horizontal direction orthogonal to the rotational shaft 10.

In some cases, a concrete mount or the like for supporting the casing 12 is disposed below the casing. Thus, it is difficult to locate the axial pipe 40 extending in the axial direction of the rotational shaft 10 below the casing 12.

In this regard, with the above configuration, the second ends 37a, 37b, 37c, 37d of the first bleed pipe 18a, the second bleed pipe 18b, the third bleed pipe 18c, and the fourth bleed pipe 18d are positioned in the same quadrant and on the outer side of the casing 12 in the horizontal direction, and thus the second ends 37a, 37b, 37c, 37d of the first bleed pipe 18a, the second bleed pipe 18b, the third bleed pipe 18c, and the fourth bleed pipe 18d can be connected to the axial pipe 40 extending in the axial direction of the rotational shaft easily.

In some embodiments, the second ends 37a, 37b, 37c, 37d of the first bleed pipe 18a, the second bleed pipe 18b, the third bleed pipe 18c, and the fourth bleed pipe 18d are positioned in the same quadrant that is positioned below the center C of the rotational shaft 10.

In some embodiments, in a cross-sectional view orthogonal to the rotational shaft 10, the ratio d/D of the inner diameter d of the port portion 16 to the outer diameter D of the bleed chamber 26 is not smaller than 1/20 and not greater than 1/2, and the plurality of port portions 16 only include the first port portion 16a, the second port portion 16b, the third port portion 16c, and the fourth port portion 16d, as shown in FIGS. 3 and 5. Nevertheless, the number of the port portions 16 is not necessarily limited to four.

In some embodiments, the rotational direction Rf of the working fluid in the bleed chamber 26 is the same as the rotational direction of the rotational shaft 10. Normally, the rotational direction Rf of the working fluid in the bleed chamber 26 is the same as the rotational direction of the rotational shaft 10.

In some embodiments, the rotational direction Rf of the working fluid in the bleed chamber 26 is opposite to the rotational direction of the rotational shaft 10. The rotational direction Rf of the working fluid in the bleed chamber 26 may be opposite to the rotational direction of the rotational shaft 10, depending on the shape of the stator vanes 24 or the position of the slit 28.

Embodiments of the present invention were described in detail above, but the present invention is not limited thereto, and various amendments and modifications may be implemented. For instance, the multistage axial compressor 2 can be applied to compressor of a working fluid other than air.

REFERENCE SINGS LIST

1 Gas turbine
2 Multistage axial compressor
4 Combustor
6 Turbine
10 Rotational shaft
12 Casing
14 Wall portion
15 Inner surface of wall portion (outer peripheral surface of bleed chamber)
16 Port portion (bleed nozzle)
16a First port portion
16b Second port portion
16c Third port portion
16d Fourth port portion
17 Inner surface of port portion
18 Bleed pipe
18a First bleed pipe
18b Second bleed pipe
18c Third bleed pipe
18d Fourth bleed pipe
19 Flow-rate adjustment valve
20 Rotor blade
22 Flow passage
24 Stator vane
26 Bleed chamber
28 Slit (communication flow passage)
30 Outlet flow passage
32 Pipe passage
34a Corner region on back side in rotational direction
34b corner region on front side in rotational direction
35 Curved surface
36 Curved portion
36a1, 3612 First curved portion
36b Second curved portion
36c Third curved portion
36d Fourth curved portion
37a Farther end of first bleed pipe
37b Farther end of second bleed pipe
37c Farther end of third bleed pipe
37d Farther end of fourth bleed pipe
38a First junction pipe
38b Second junction pipe
40 Pipe (axial pipe)
C Center of rotational shaft
d Inner diameter of port portion
D Outer diameter of bleed chamber
X, Y, Z Intersection
L Line passing through X and Y
Rf Rotational direction of working fluid in bleed chamber
R Curvature radius

The invention claimed is:

1. A multistage axial compressor, comprising:
a rotational shaft to which a plurality of rotor blades are mounted, the rotational shaft extending along an axis of the multistage axial compressor;
a casing surrounding the rotational shaft, the casing forming a flow passage of a working fluid between the rotational shaft and the casing;
a wall portion having an annular shape and extending in a circumferential direction of the rotational shaft so as to surround the casing, the wall portion forming a bleed chamber having an annular shape and being in communication with the flow passage;
a plurality of port portions connected to an outer peripheral surface of the wall portion, the port portions forming respective outlet flow passages which are in communication with the bleed chamber; and
a plurality of bleed pipes connected to the respective port portions,
wherein, in a cross section orthogonal to the axis, of two corner regions where an inner surface of each of the port portions and an inner surface of the wall portion intersect with each other, at the corner region positioned on a back side in a rotational direction of the working fluid in the bleed chamber, when θ1 is defined as an angle formed between the inner surface of the port portion and the inner surface of the wall portion,
the angle θ1 is not greater than 225°,
wherein, in the cross section orthogonal to the axis, of the two corner regions where the inner surface of each of the port portions and the inner surface of the wall portion intersect with each other, at the corner region positioned on a front side in the rotational direction of the working fluid in the bleed chamber, when θ2 is defined as an angle formed between the inner surface of the port portion and the inner surface of the wall portion,
the angle θ2 is not smaller than 315°,
wherein, when d is an inner diameter of each of the port portions and D is an outer diameter of the bleed chamber, in the cross section orthogonal to the axis,
the angle θ1 satisfies a relationship expressed by the following expression:

$$270°-\sin^{-1}((1-d/D)^{\wedge}0.5)\cdot 180°/\pi \leq \theta 1, \text{ and}$$

the angle θ2 satisfies a relationship expressed by the following expression:

$$\theta 2 \leq 270°+\sin^{-1}((1-d/D)^{\wedge}0.5)\cdot 180°/\pi,$$

wherein, in the cross section orthogonal to the axis, at least one of the plurality of bleed pipes includes at least one curved portion, and
wherein, when d is an inner diameter of each of the port portions in the cross section orthogonal to the axis and R is a curvature radius of the at least one curved portion,
a ratio R/d of the curvature radius R of the at least one curved portion to the inner diameter d of each of the port portions satisfies a relationship expressed by the following expression:

$$2 \leq R/d.$$

2. The multistage axial compressor according to claim 1,
wherein the rotational shaft extends in a horizontal direction,
wherein the plurality of port portions include a first port portion, a second port portion, a third port portion, and a fourth port portion, which are arranged in this order in the circumferential direction of the rotational shaft,
wherein the first portion and the second port portion are positioned on a first side of a center of the rotational shaft in a horizontal direction orthogonal to the rotational shaft, in the cross-sectional view orthogonal to the rotational shaft,
wherein the third port portion and the fourth port portion are positioned on a second side opposite to the first side of the center of the rotational shaft in the horizontal direction orthogonal to the rotational shaft, in the cross-sectional view orthogonal to the rotational shaft, wherein the first port portion and the third port portion extend along the horizontal direction orthogonal to the rotational shaft, and wherein the second port portion and the fourth port portion extend along a vertical direction.

3. The multistage axial compressor according to claim 1, wherein the rotational shaft extends in a horizontal direction, wherein the plurality of port portions include a first port portion, a second port portion, a third port portion, and a fourth port portion, wherein, when a circumferential position of a top portion of an outer peripheral surface of the wall portion is 0° in the cross-sectional view orthogonal to the rotational shaft, an intersection between the outer peripheral surface of the wall portion and an axis of the first port portion is at a circumferential position of not smaller than 30° and not greater than 60°, an intersection between the outer peripheral surface of the wall portion and an axis of the second port portion is at a circumferential position of not smaller than 120° and not greater than 150°, an intersection between the outer peripheral surface of the wall portion and an axis of the third port portion is at a circumferential position of not smaller than 200° and not greater than 230°, and an intersection between the outer peripheral surface of the wall portion and an axis of the fourth port portion is at a circumferential position of not smaller than 290° and not greater than 320°.

4. The multistage axial compressor according to claim 1, wherein the rotational shaft extends in a horizontal direction, wherein the plurality of port portions include a first port portion, a second port portion, a third port portion, and a fourth port portion, which are arranged in this order in the circumferential direction of the rotational shaft, wherein the first port portion and the second port portion are positioned on a first side of a center of the rotational shaft in a horizontal direction orthogonal to the rotational shaft, in the cross-sectional view orthogonal to the rotational shaft, wherein the third port portion and the fourth port portion are positioned on a second side opposite to the first side of the center of the rotational shaft in the horizontal direction orthogonal to the rotational shaft, in the cross-sectional view orthogonal to the rotational shaft, wherein the plurality of bleed pipes include a first bleed pipe, a second bleed pipe, a third bleed pipe, and a fourth bleed pipe connected to the first port portion, the second port portion, the third port portion, and the fourth port portions, respectively, wherein, when the cross-sectional view orthogonal to the rotational axis is divided into four quadrants at a vertical axis and a horizontal axis, so as to have an origin at the center of the rotational shaft, distal ends of the first bleed pipe, the second bleed pipe, the third bleed pipe, and the fourth bleed pipe positioned farther from the bleed chamber than proximal ends thereof are positioned in the same quadrant of the four quadrants.

5. The multistage axial compressor according to claim 4, wherein the distal ends of the first bleed pipe, the second bleed pipe, the third bleed pipe, and the fourth bleed pipe are positioned on an outer side of the casing, in the horizontal direction orthogonal to the rotational shaft.

6. A gas turbine, comprising:
a multistage axial compressor according to claim 1;
a combustor capable of producing combustion gas by combusting fuel by utilizing air compressed by the multistage axial compressor; and
a turbine capable of outputting power by utilizing combustion gas produced in the combustor.

7. A multistage axial compressor, comprising:
a rotational shaft to which a plurality of rotor blades are mounted;
a casing surrounding the rotational shaft, the casing forming a flow passage of a working fluid between the rotational shaft and the casing;
a wall portion having an annular shape and extending in a circumferential direction of the rotational shaft so as to surround the casing, the wall portion forming a bleed chamber having an annular shape and being in communication with the flow passage;
a plurality of port portions connected to an outer peripheral surface of the wall portion, the port portions forming respective outlet flow passages which are in communication with the bleed chamber; and
a plurality of bleed pipes connected to the respective port portions,
wherein, in a cross-sectional view orthogonal to the rotational shaft, of two corner regions where an inner surface of each of the port portions and an inner surface of the wall portion intersect with each other, at the corner region positioned on a back side in a rotational direction of the working fluid in the bleed chamber, when $\theta 1$ is defined as an angle formed between the inner surface of the port portion and the inner surface of the wall portion,
the angle $\theta 1$ is not greater than 225°,
wherein at least one of the plurality of bleed pipes includes at least one curved portion,
wherein, when d is an inner diameter of each of the port portions in the cross-sectional view orthogonal to the rotational shaft and R is a curvature radius of the at least one curved portion, a ratio R/d of the curvature radius R of the at least one curved portion to the inner diameter d of the port portion satisfies a relationship expressed by the following expression:

$$2 \leq R/d,$$

wherein the rotational shaft extends in a horizontal direction,
wherein the plurality of port portions include a first port portion, a second port portion, a third port portion, and a fourth port portion, which are arranged in this order in the circumferential direction of the rotational shaft,
wherein the first portion and the second port portion are positioned on a first side of a center of the rotational shaft in a horizontal direction orthogonal to the rotational shaft, in the cross-sectional view orthogonal to the rotational shaft,
wherein the third port portion and the fourth port portion are positioned on a second side opposite to the first side of the center of the rotational shaft in the horizontal direction orthogonal to the rotational shaft, in the cross-sectional view orthogonal to the rotational shaft,
wherein the plurality of bleed pipes include a first bleed pipe, a second bleed pipe, a third bleed pipe, and a fourth bleed pipe connected to the first port portion, the second port portion, the third port portion, and the fourth port portions, respectively, wherein the first bleed pipe and the second bleed pipe extend to the second side of the center of the rotational shaft in the horizontal direction orthogonal to the rotational shaft, in the cross-sectional view orthogonal to the rotational shaft, wherein the at least one curved portion includes a first curved portion forming a part of the first bleed pipe and a second curved portion forming a part of the second bleed pipe, and wherein the first curved portion and the second curved portion are curved so that a rotational direction of the working fluid flowing through the first curved portion and the second curved portion is the same as a rotational direction of the working fluid in the bleed chamber in the cross-sectional view orthogonal to the rotational shaft.

8. The multistage axial compressor according to claim 7, wherein the at least one curved portion includes a third curved portion forming a part of the third bleed pipe and a fourth curved portion forming a part of the fourth bleed pipe, and wherein the third curved portion and the fourth curved portion are curved so that a rotational direction of the working fluid flowing through the third curved portion and the fourth curved portion is opposite to the rotational direction of the working fluid in the bleed chamber, in the cross-sectional view orthogonal to the rotational shaft.

9. A gas turbine, comprising:

a multistage axial compressor according to claim 7;

a combustor capable of producing combustion gas by combusting fuel by utilizing air compressed by the multistage axial compressor; and a turbine capable of outputting power by utilizing combustion gas produced in the combustor.

\* \* \* \* \*